United States Patent [19]

Mayer

[11] Patent Number: 4,860,691
[45] Date of Patent: Aug. 29, 1989

[54] ANIMAL FEEDER

[76] Inventor: Lowell A. Mayer, N. 3900 Fairwood Rd., Reeseville, Wis. 53579

[21] Appl. No.: 150,827

[22] Filed: Feb. 1, 1988

[51] Int. Cl.⁴ ............................................. A01K 5/00
[52] U.S. Cl. ................................................. 119/51.5
[58] Field of Search ....................... 119/51.5, 52 R, 18, 119/23, 61

[56] References Cited

U.S. PATENT DOCUMENTS

| | | | |
|---|---|---|---|
| 1,855,314 | 4/1932 | Schact | 119/51.5 |
| 2,555,396 | 6/1951 | Cosner | 119/51.5 |
| 3,651,787 | 3/1972 | Cooper | 119/51.5 X |
| 3,776,193 | 12/1973 | Post, Sr. | 119/51.5 |
| 4,044,723 | 8/1977 | Fitzpatrick | 119/51.5 X |
| 4,131,082 | 12/1978 | Sollars | 119/51.5 |
| 4,357,905 | 11/1982 | Carpenter | 119/51.5 X |
| 4,532,891 | 8/1985 | Jones | 119/51.5 X |
| 4,699,089 | 10/1987 | Teschke | 119/51.5 |

FOREIGN PATENT DOCUMENTS 12056 9/1884 United Kingdom ............. 119/52 R

Primary Examiner—Gene Mancene
Assistant Examiner—R. Thomas Price
Attorney, Agent, or Firm—Donald Cayen

[57] ABSTRACT

A sturdy animal feeding station contains separate food and water compartments. The water compartment is sized to hold an extended supply of water in a container that fits within the water compartment with minimum clearance thereround. The food compartment defines a depression for holding a quantity of food at a convenient level above the feed floor. An outdoor version includes a roof, and a depression in the water compartment floor for receiving a heating element that keeps the water from freezing in sub-freezing weather. In an indoor version, the roof and water compartment depression are eliminated.

19 Claims, 5 Drawing Sheets

ANIMAL FEEDER

BACKGROUND OF THE INVENTION

1. Field of the Invention. This invention pertains to animal care, and more particularly to apparatus for storing food and water for pets on a year around basis.

2. Description of the Prior Art. The problems associated with feeding and watering pet dogs are well known. For the owner's convenience, it is desirable that a large supply be available to the pet so that the supply need be only infrequently replenished. On the other hand, dogs tend to spill unconsumed provisions, which is both uneconomical and unsanitary. Particularly with indoor feeding, it is very difficult to provide suitable arrangements for furnishing food and water on an unattended basis.

The problems remain if outdoor feeding locations are chosen. The greater size and activity of outdoor dogs increases the risk of spillage and waste. Although perhaps the environmental problems are less serious than with food and water spilled indoors, outdoor spillage is nevertheless unsightly and unsanitary. An additional problem associated with outdoor feeding locations is that the food and water must be protected from the weather and from airborn pollutants. Further, in cold weather the water must be protected from freezing.

Various products have been developed in attempts to solve the foregoing problems. For example, U.S. Pat. No. 1,831,593 shows an animal feeder especially designed for use by mink. The feeding housing is quite unsatisfactory for dogs, however, because the food and water bowls are individually accessible only from opposite ends of the housing.

U.S. Pat. No. 2,845,896 shows an animal feeding cabinet that includes a roof and a moveable shelf for storing food and water inside the cabinet. The moveable shelf must be opened by the owner each time his pet wants to eat or drink and then closed when the pet is finished. The required presence of the owner for operating the feeding station of the U.S. Pat. No. 2,845,896 is a great inconvenience.

U.S. Pat. No. 3,121,419 discloses a pet feeding station that has a hinged cover for protecting the food and water. By walking on a treadle, the pet operates the cover to pivot open and expose the food and water. That device is not completely satisfactory, because the working parts may stick in either the open or closed position, thus defeating the purpose of the cover.

U.S. Pat. Nos. 1,855,314; 3,651,787; and 4,044,723 show feeding stands that raise the food and water off the ground. In U.S. Pat. Nos. 1,855,314 and 4,044,723 the bowls are completely exposed, so any spillage falls unsanitarily onto the ground or tabletop, respectively. In U.S. Pat. No. 3,651,787, the bowls are only loosely set in place, so they can be pushed around and the contents spilled. None of the feeders of the aforementioned patents offer protection against the weather.

Thus, a need exists for an improved animal feeding station that stores and protects food and water in a convenient and sanitary manner.

SUMMARY OF THE INVENTION

In accordance with the present invention, a sturdy and attractive animal feeder is provided that furnishes food and water on a long term basis. This is accomplished by apparatus that includes a roofed housing having an integral food bowl and a large water capacity.

The housing is completely enclosed on five sides, and it is partially enclosed on a sixth side. To protect the food and water stored inside the housing from rain and snow, the housing includes a roof that extends over the partially open side.

The housing has a floor that is on two levels, and a center divider separates the two levels from front to back into two approximately equal sized areas. The first level approximately coincides with the housing bottom wall, which is supported off the ground a short distance by a pair of feet. The first inside floor level has an area large enough to hold a large water pail. The second floor level is preferably several inches above the first level. Formed in the second floor level is a depression that has sufficient size to hold a quantity of animal food.

To prevent spilling the water in the pail placed on the first floor level, the housing includes a front wall that extends from the first level to approximately the height of the pail. To provide relatively easy access to the food in the food depression, the housing front wall extends only a short distance above the second floor level. Accordingly, the housing front wall is in two heights. Thus, the housing floor, first level, adjacent side and front walls, back wall, and center divider define a first compartment for the water supply. Similarly, the housing second floor level, adjacent side and front walls, center divider, and back wall define a second compartment for the food supply. The center divider preferably has a height that is a few inches above the second floor level.

In the preferred embodiment, the bilevel floors of the food and water compartments are created by an insert that is installed on top of the housing bottom wall. The insert comprises a pair of horizontal panels separated by the vertical center divider. The first panel lies on the housing bottom wall and corresponds to the housing floor first level of the water compartment. To warm the water in freezing weather, the first panel is formed with a depression sized to accept a commercially available heating pad. The depression is relatively shallow such that the bottom of the water pail contacts the heating pad. Alternately, an emersion heating element may be submerged in the water pail.

The second panel of the bilevel insert is raised several inches off the housing bottom wall and corresponds to the housing floor second level of the food compartment. Preferably, the center divider is formed integrally with and is a smooth extension of the two panels. The first panel blends into a vertical surface that rises to several inches above the second panel, then reverses in an inverted U-shaped cross section to blend into the second panel.

For ease of construction and to provide an attractive and sanitary appearance, the preferred material for the animal feeder of the present invention is a smooth fiberglass plastic. With that material, the bilevel insert may be joined to the housing by means of any suitable adhesive. To further simplify construction, the front wall of the housing may be made as a separate piece that interfits with the housing side, top, and bottom walls. A decorative rubber strip may be placed over exposed edges.

Further in accordance with the present invention, the animal feeder may be manufactured in a design that is suitable for indoor feeding locations. In that design, the housing roof is eliminated from the outdoor feeder. The side and back walls terminate at approximately the level of the water compartment front wall. An attractive U-shaped molding is bonded to the exposed top edges of the side and back walls.

Other advantages, benefits, and features of the present invention will become apparent to those skilled in the art upon reading the detailed description of the invention.

DETAILED DESCRIPTION OF THE INVENTION

Figure 1:
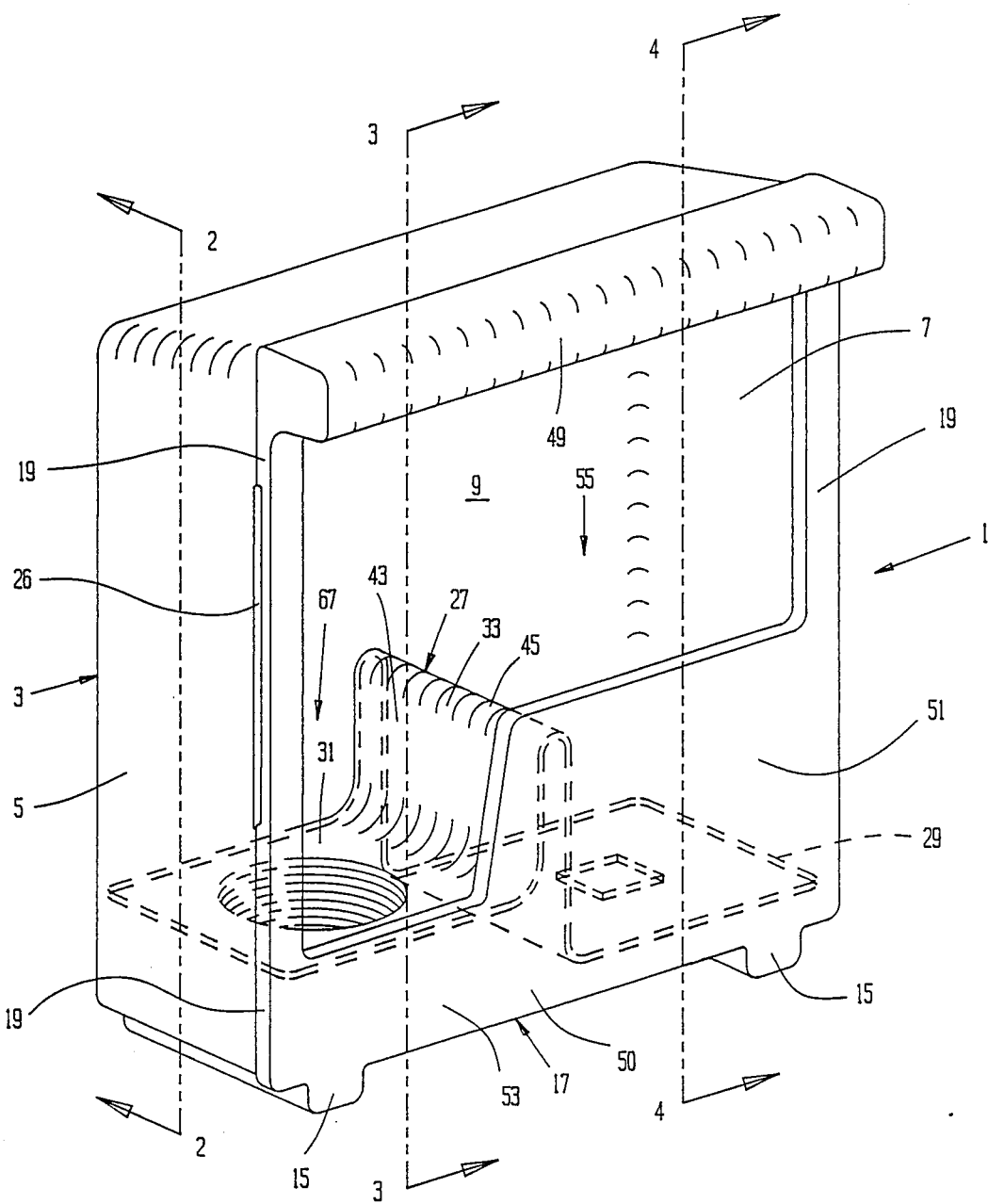
FIG. 1 is a partially broken perspective view of the animal feeder of the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1-4, an animal feeder 1 is illustrated that includes the present invention. The animal feeder is particularly useful for storing supplies of food and water for pet dogs at outdoor locations.

In the illustrated construction, the animal feeder 1 is composed of three major components. The first major component is a housing 3 having opposed side walls 5 and 7, a back wll 9, a roof 11, and a bottom wall 13. The bottom wall 13 is raised above the ground by a pair of feet 15. The second major component is a front panel 17. The front panel has narrow opposed side walls 19, a short roof 21, and a short bottom wall 23. The short walls of the front panel 17 nest over the corresponding components of the housing 3.

As illustrated, the housing and front panel are advantageously manufactured from a moldable synthetic material such as an injection moldable thermosetting plastic or a fiberglass material. However, it will be understood that other suitable materials may also be utilized. Indeed, the present invention contemplates that the housing and front panel may be manufactured in a variety of constructions, including a construction wherein the housing and front panel are formed as a single component. With a construction of moldable synthetic materials, the housing and front panel are joined to each other by means of a bonding adhesive along joints 25 between those two components. A decorative molding 26 is used to cover the exposed edges of the front panel.

Figure 2:
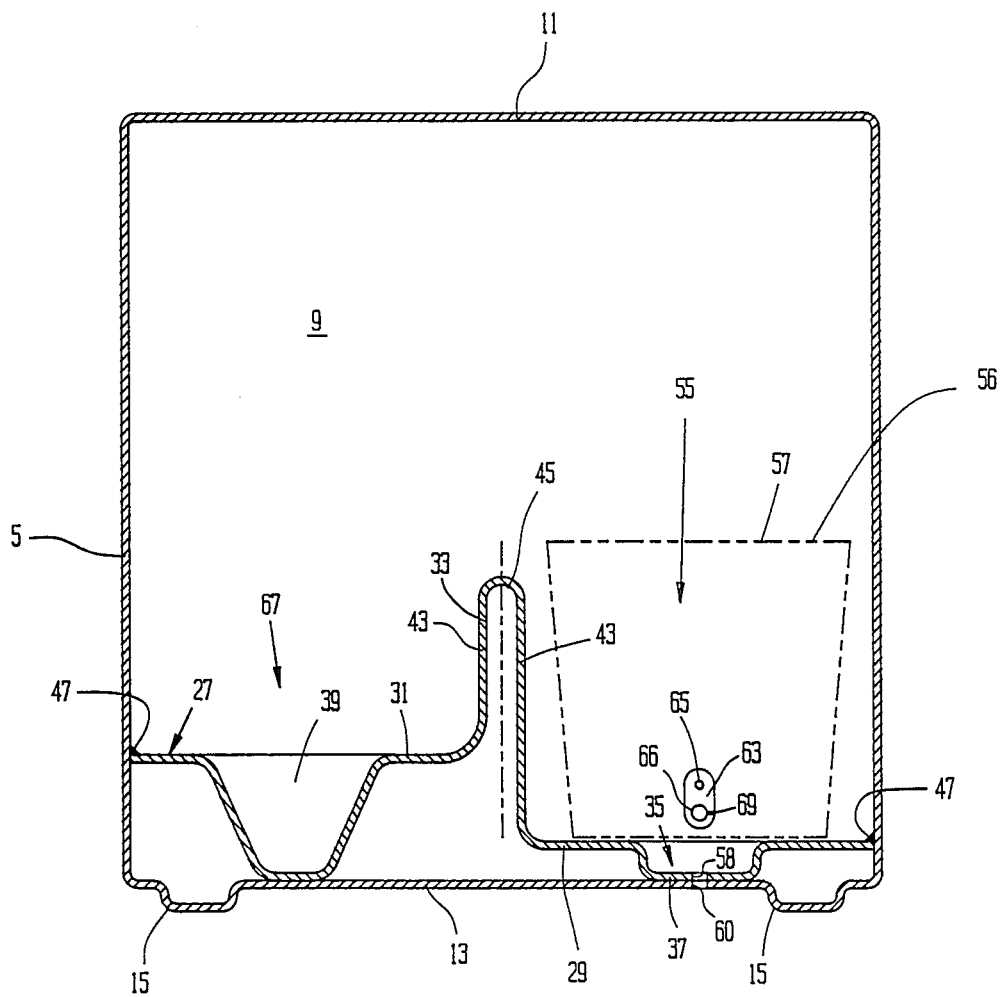
FIG. 2 is a cross sectional view taken along lines 2—2 of FIG. 1.

Placed on the housing bottom wall 13 is an insert 27. As best shown in FIGS. 1 and 2, the insert 27 comprises a first panel 29 at a first level, a second panel 31 at a second level, and a divider 33 that separates the two levels. In the construction illustrated, the insert is manufactured from a moldable material such as a fiberglass plastic. However, as with the housing 3 and front panel 17, the insert may be made of any suitable material. Further, the structural components of the two panels 29, 31 and the divider 33 may be formed integrally with the housing 3 and front panel 17 in a one piece construction, if desired.

The first panel 29 may be constructed to lie flat on the housing bottom wall 13. Preferably, however, the first panel is formed with a shallow depression 35, with the bottom wall 37 of the depression resting on the housing bottom wall.

The insert second panel 31 is raised several inches above the level of the first panel 29. Formed in approximately the center of the second panel is a depression 39. The bottom wall 41 of the depression 39 rests on the housing bottom wall 13.

Separating the first and second panels 29, 31 respectively, and joining them into the unitary insert 27 is the vertical divider 33. Although the divider may be a solid member, it is preferred that it consist of two spaced vertical walls 43 joined at their upper ends 45 in a smooth radius. To retain the insert within the housing 3 and attached front panel 17, the joints 47 between the three components are bonded with a suitable adhesive.

Figure 3:
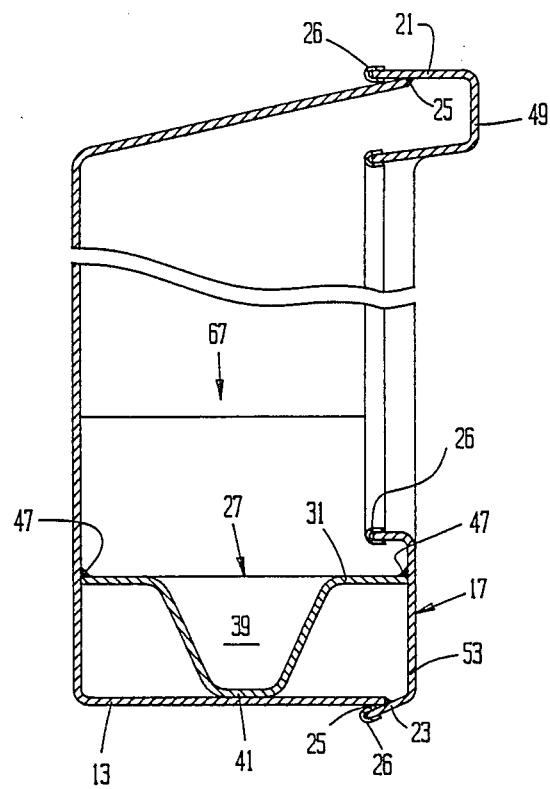
FIG. 3 is a cross sectional view taken along lines 3—3 of FIG. 1.
Figure 4:
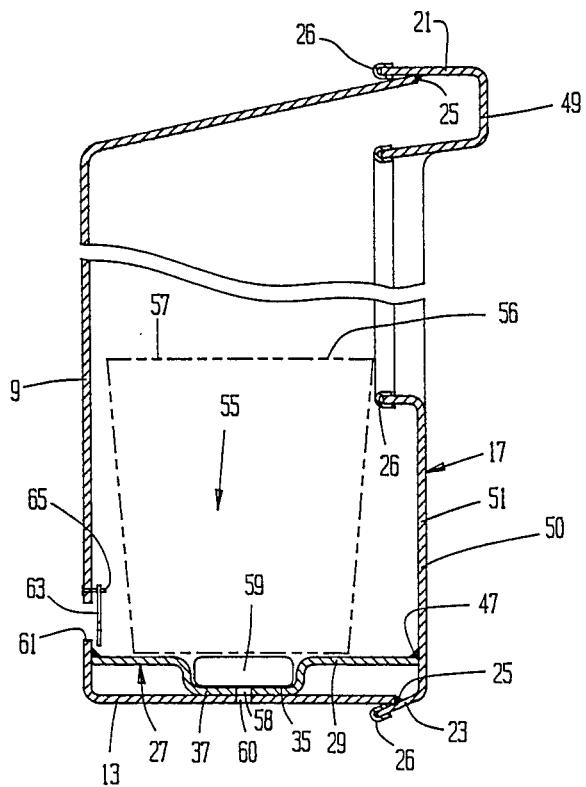
FIG. 4 is a cross sectional view taken along lines 4—4 of FIG. 1.

As best shown in FIGS. 1, 3, and 4, the front panel 17 is fabricated with a generally U-shaped overhanging roof section 49 that extends outwardly from the panel top wall 21. The front panel is further fabricated with a bilevel front wall 50. The first portion 51 of the front wall 50 extends from the panel bottom wall 23 to a short distance above the upper end 45 of the divider 33 and covers the front ends of the two divider walls 43. The front wall second portion 53 extends from the front panel bottom wall to a short distance above the insert second horizontal panel 31. Thus, the front panel front wall, side walls 19, and roof 49 define a generally L-shaped opening in the front of the animal feeder 1, as best seen in FIG. 1.

The insert first horizontal panel 29, front panel front wall first portion 51, housing side and back walls 7 and 9, respectively, and the insert divider 33 cooperate to define a water compartment 55. The dimensions of the various components are chosen such that a square two gallon pail 57 may be placed in the water compartment 55 with just a small amount of clearance around its upper edge 56. I have found that two gallons of water will supply a large dog for up to three days without attention. Since the pail 57 is completely protected from spilling, it can be filled and left with confidence that the pet will have the benefit of all the water in it. To permit drainage from the water compartment 55, the bottom wall 37 of the insert depression 35 has a hole 58, and the bottom wall 13 of the housing 3 has an aligned hole 60.

Ordinarily, the pail 57 rests on the insert first panel 29. To keep the water in the pail from freezing in cold weather, a commercial heating pad 59 may be placed within the depression 35. The depth of the depression is such that the heating pad 59 protrudes slightly above the first panel. Consequently, the pail contacts the heating pad to assure maximum heat transfer to the pail and water. Alternately, a conventional emersion type water heater, not shown, may be placed within the pail. The power cord for either the pad or the emersion type heater passes through an opening 61 in the housing back wall 9. The housing opening 61 is covered by a patch 63 of tough flexible material such as leather or rubber. The patch 63 is held in place with a conventional screw or rivet 65. For clarity, the patch is shown in FIG. 4 at an exaggerated distance from the back wall. The patch has a hole 66 in it, together with a slit 69 for permitting the electrical cord to be received within the hole 66. The feeder 1 is designed to keep the water in the pail at approximately 35 degrees to 50 degrees F. at sub-freezing temperatures.

The insert second panel 31, front panel front wall portion 53, housing side and back walls 5 and 9, respectively, and divider 33 define a food compartment 67. Food is placed within the second panel depression 39, where it is easily accessible to the pet over the front wall portion 53. Since tipping or spilling the food from the food compartment 67 is impossible, the animal feeder 1 of the present invention can supply food on a long-term basis without waste or mess.

Figure 5:
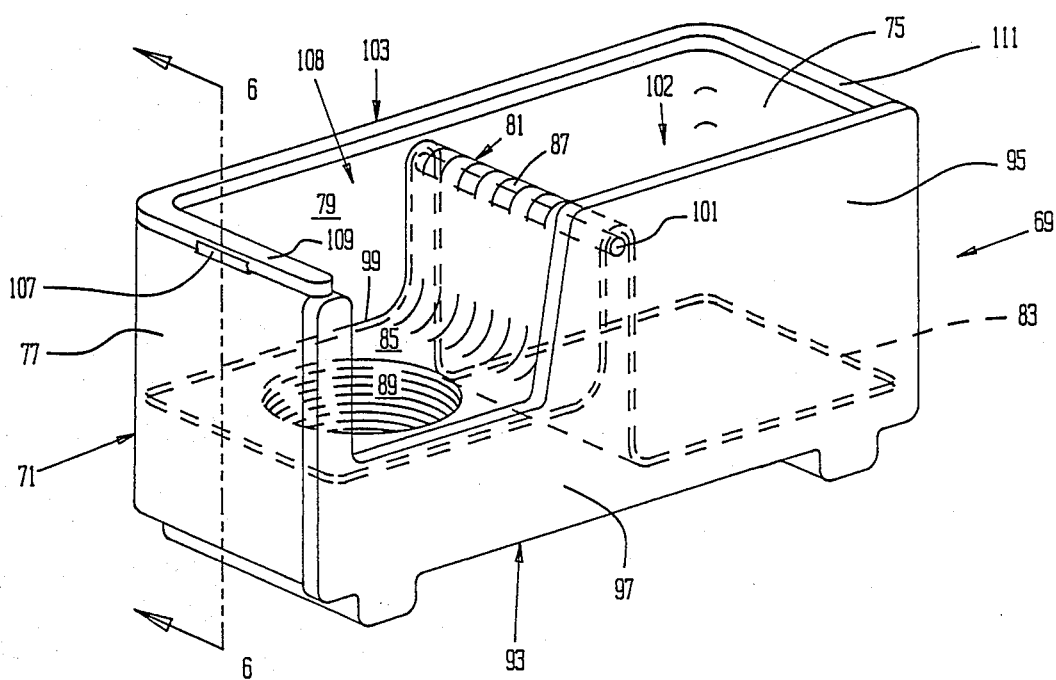
FIG. 5 is a partially broken perspective view of a modified animal feeder according to the present invention.
Figure 6:
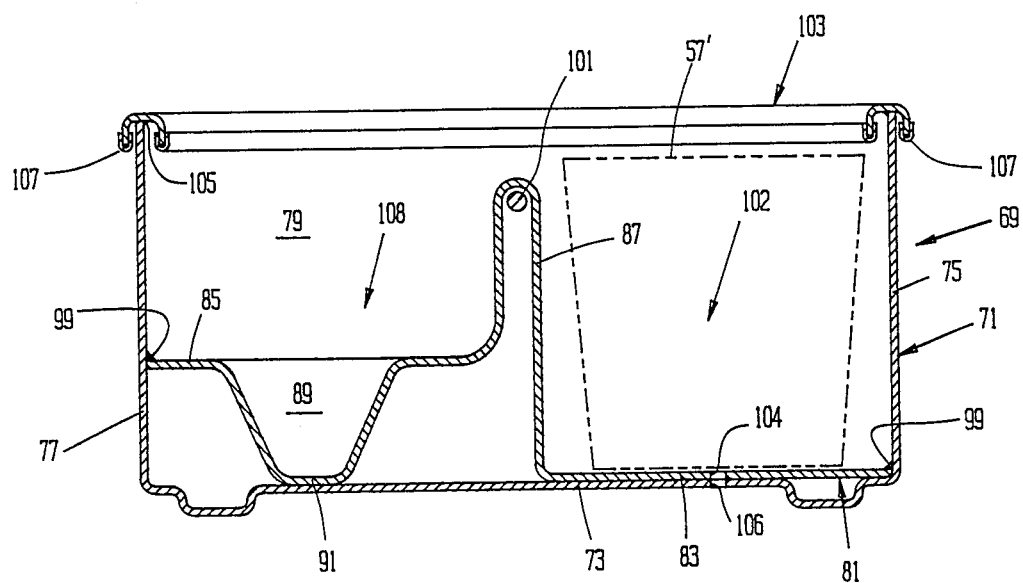
FIG. 6 is a cross sectional view taken along lines 6—6 of FIG. 5.

Further in accordance with the present invention, the animal feeder may be fabricated in an embodiment eminently suitable for indoor use. Referring to FIGS. 5 and 6, an indoor animal feeder 69 is illustrated that is similar in many ways to the animal feeder 1 previously described. The animal feeder 69 comprises a housing 71 having a bottom wall 73, side walls 75 and 77, and a back wall 79. The animal feeder further comprises an insert 81 that may be almost identical to the insert 27 described with respect to FIGS. 1-4. However, there is no depression in the insert 81. Rather, the insert first panel 83 rests directly on the housing bottom wall 73. The insert 81 has a second panel 85 separated from the first panel by a center divider 87. The second panel 85 has a depression 89 with a bottom wall 91 that rests on the housing bottom wall 73.

The animal feeder 69 further comprises a front panel 93 that is generally similar to the lower portion of the front panel 17 described in connection with FIGS. 1-4. That is, the front panel 93 has a front wall first portion 95 that extends to a height above the center divider 87 and a second portion 97 that extends to a height just a short distance above the insert second panel 85.

As illustrated, the housing 71, front panel 93, and insert 81 are manufactured as three separate pieces from a moldable material. However, as with the animal feeder 1 previously described, the three pieces of the indoor animal feeder 69 may be made as one integral piece. With a multi-piece construction, the joints 99 are bonded with a suitable adhesive. To provide additional strength and rigidity to the indoor animal feeder, a long tube or rod 101 extends between and is fastened to the housing back wall 79 and the front panel.

The housing side wall 75, back wall 79, insert center divider 87, and front panel front wall portion 95, and the insert first panel 83 define a water compartment 102 for surrounding the water pail 57, To provide drainage for the water compartment 102, the insert first panel contains a hole 104 that is aligned with a similar hole 106 in the housing bottom wall 73. The housing side wall 77 and back wall 79, insert divider 87, front panel front wall portion 97, and insert second panel 85 define a food compartment 108. The food is placed within the insert depression 89, where it is easily accessible over the front panel front wall portion 97.

To provide a neat appearance and safe construction, the animal feeder 69 includes a decorative top cover 103. The top cover 103 is generally U-shaped, as viewed from the top, to fit over the housing side walls 75 and 77 and the back wall 79. As best seen in FIG. 6, the cover has a U-shaped cross section that nests over the upper edges of the housing side and back walls. The joints 105 between the housing and the cover are joined with a suitable adhesive. A decorative molding 107 hides the cover free edges.

As best shown in FIG. 5, the end 109 of the cover 103 adjacent the food compartment 108 preferably has a round contour that extends over the front panel front wall portion 97. The cover second end 111 preferably has a flat end that abuts the backside of the front panel front wall portion 95. As with the housing 71, front panel 93, and insert 81, the cover 103 may be made of any suitable material, and it may also be an integral piece with the housing 71, front panel 93, and insert 81.

Thus, it is apparent that there has been provided, in accordance with the invention, an animal feeder that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. An animal feeder comprising:
   a. a housing having top, bottom, and back walls, and first and second side walls arranged to form a five-sided enclosure with an open front;
   b. a front panel extending across the housing open front and having a first wall portion adjacent the housing first side wall that extends from the housing bottom wall for a first predetermined distance thereabove and a second wall portion adjacent the housing second side wall that extends for a second predetermined distance above the housing bottom wall;
   c. a center divider extending between the housing back wall and the front panel and extending above the housing bottom wall for a height approximately equal to the height of the front panel first wall portion;
   d. a first panel located at a first predetermined height above the housing bottom wall and having a periphery that contacts the housing first side and back walls, front wall first wall portion, and center divider to cooperate therewith to define a first compartment; and
   e. a second panel located at a second predetermined height above the housing bottom wall higher than the first predetermined height, the second panel having a periphery that contacts the housing second side and back walls, front panel second wall portion, and center divider to cooperate therewith to define a second compartment.

2. The animal feeder of claim 1 wherein the first panel defines a first depression that extends from the plane of the first panel to the housing bottom wall, the first depression supporting the first panel on the housing bottom wall and being sized to store a quantity of animal food.

3. The animal feeder of claim 1 wherein the second panel defines a second depression that extends from the second panel to the housing bottom wall, the second depression being sized to accept a heating element, the second depression supporting the second panel on the housing bottom wall,
   so that a pail of water placed in the second compartment directly contacts the heating element to heat the water in cold weather.

4. The animal feeder of claim 3 wherein the depression in the second panel and the housing bottom wall define generally aligned holes for permitting drainage of water from the second compartment.

5. The animal feeder of claim 1 wherein:
 a. the housing and front panel are fabricated as first and second separate pieces; and
 b. the center divider and first and second panels are fabricated as an integral piece for inserting into the housing for resting on the bottom wall thereof.

6. The animal feeder of claim 5 wherein:
 a. the housing and front panels have respective free ends, the front panel free ends generally overlaying the housing free ends;
 b. the housing, front panel, and insert are fabricated from a moldable thermosetting plastic material; and
 c. the animal feeder further comprises decorative U-shaped moldings secured over the free edges of the front panel.

7. Apparatus for furnishing food and water to an animal on an unattended basis comprising:
 a. a housing having top, bottom, back, and first and second side walls, and an open front;
 b. a front panel covering the housing open front, the front panel defining an opening therethrough having a top boundary spaced a predetermined distance from the housing top wall, first and second side boundaries spaced predetermined distances from the housing first and second side walls, respectively, a first bottom boundary spaced a first predetermined distance above the housing bottom wall and extending approximately midway between the housing first and second side walls, a second bottom boundary spaced a second predetermined height above the housing bottom wall less than the first height; and
 c. an insert supported on the housing floor comprising:
  i. a vertical center divider extending between the housing back wall and the front panel and having a height approximately equal to the height of the first front panel boundary above the housing bottom wall;
  ii. a first horizontal panel at a first predetermined distance above the housing bottom wall and covering the housing bottom wall between the center panel and the housing first side wall; and
  iii. a second horizontal panel at a second predetermined distance above the housing bottom wall greater than the distance of the first panel and extending between the center divider and the housing second side wall,
 so that the center divider divides the housing into the water and food compartments corresponding with the first and second horizontal panels, respectively.

8. The apparatus of claim 7 wherein:
 a. the housing, front panel, and insert are manufactured as separate pieces;
 b. the front panel has free edges that overlie the housing top and side walls; and
 c. the periphery of the insert is contiguous with and secured to the front panel and to the housing back and side walls.

9. The apparatus of claim 7 wherein the insert first panel defines a first depression sized to receive a selected heating element, the first depression supporting the first panel on the housing bottom wall, so that a water container placed on the first panel contacts the heating element.

10. The apparatus of claim 7 wherein the insert second panel defines a second depression sized to hold a quantity of animal food, the second depression having a bottom wall resting on the housing bottom wall for supporting the second panel.

11. The apparatus of claim 7 wherein the front panel further defines a roof that overhangs the opening through the front panel.

12. An animal feeder comprising:
 a. a housing having a bottom wall and back and first and second side walls of a first predetermined height above the bottom wall, the back and first and second side walls having respective free top edges;
 b. a front panel attached to and extending between the housing side walls, the front panel having a first portion with a first height approximately equal to the first height of the housing side and back walls, and a second portion with a second height less than the first height;
 c. a center divider extending between the back wall and the first portion of the front panel to thereby create separate food and water compartments; and
 d. a panel at a predetermined height above and generally parallel to the housing bottom wall and extending between and being joined to the housing second wall and the center divider, the panel height being a short distance less than the height of the front panel second portion.

13. The animal feeder of claim 12 further comprising cover means for covering the top edges of the housing side and back walls.

14. The animal feeder of claim 13 wherein the panel defines a depression for holding a quantity of animal food, the depression having a bottom wall that rests on the housing bottom wall for supporting the panel.

15. The animal feeder of claim 12 wherein:
 a. the housing and front panel are manufactured as separate parts and are fastened together; and
 b. the center divider and panel are manufactured as an integral part that is inserted into and attached to the housing and front panel.

16. An indoor animal feeding station comprising:
 a. a housing having a bottom wall and upstanding opposed side walls and a back wall, the side and back walls having free edges;
 b. a front panel joined to the housing and extending between the side walls thereof, the front panel having a first portion with a height a first predetermined amount higher than the housing side walls and a second portion with a height a second predetermined amount lower than the housing side walls; and
 c. an insert comprising:
  i. a center divider extending between the housing back wall and the front panel first portion to divide the bottom wall into food and water compartments; and
  ii. a horizontal panel extending between the center divider and the first housing side wall at a predetermined height above the housing bottom wall.

17. The indoor animal feeding station of claim 16 wherein the horizontal panel defines a depression for receiving a ration of animal food, and wherein the depression has a bottom wall that rests on the housing bottom wall to support the second panel thereon.

18. The indoor animal feeding station of claim 16 further comprising a generally U-shaped cover for covering the free edges of the housing side and back walls.

19. The indoor animal feeding station of claim 18 wherein:

a. the front panel further comprises a third portion having a top surface at a height substantially equal to the height of the housing side walls; and b. the U-shaped cover covers the top surface of the front panel third portion.

* * * * *